United States Patent
Vermoortele et al.

(10) Patent No.: US 6,458,197 B1
(45) Date of Patent: Oct. 1, 2002

(54) HEAT RESISTANT BISMUTH VANADATE PIGMENT AND PROCESS FOR ITS MANUFACTURE

(75) Inventors: Frank Vermoortele, Marq en Baroeuil (FR); Emile Joseph Buyse, Mouscron (BE)

(73) Assignee: Gebroeders Cappelle, N.V., Menen (BE)

( * ) Notice: Subject to any disclaimer, the term of this patent is extended or adjusted under 35 U.S.C. 154(b) by 0 days.

(21) Appl. No.: 09/667,263

(22) Filed: Sep. 22, 2000

(30) Foreign Application Priority Data

Sep. 22, 1999 (EP) .......................... 99 870 193

(51) Int. Cl.⁷ .............................. C09C 1/00; C09C 3/06
(52) U.S. Cl. .................. 106/479; 106/419; 106/430; 106/431; 428/688; 428/689; 428/697; 428/702; 428/704
(58) Field of Search ................. 106/479, 419, 106/430, 431; 428/688, 689, 697, 702, 704

(56) References Cited

U.S. PATENT DOCUMENTS

| | | | |
|---|---|---|---|
| 2,405,366 A | | 8/1946 | Myhren et al. |
| 3,126,352 A | | 3/1964 | Blair et al. |
| 3,649,172 A | | 3/1972 | Nies et al. |
| 3,843,554 A | | 10/1974 | Aykan et al. |
| 4,026,722 A | | 5/1977 | Hess |
| 4,063,956 A | | 12/1977 | Higgins |
| 4,115,142 A | | 9/1978 | Hess |
| 4,455,174 A | | 6/1984 | Wienand et al. |
| 4,681,637 A | | 7/1987 | Rademachers et al. |
| 4,752,460 A | | 6/1988 | Herren |
| 4,781,761 A | | 11/1988 | Jacobson |
| 4,784,761 A | | 11/1988 | Okvist |
| 4,851,049 A | | 7/1989 | Wienand et al. |
| 5,123,965 A | | 6/1992 | Herren et al. |
| 5,207,828 A | | 5/1993 | Ressler et al. |
| 5,248,337 A | | 9/1993 | Matsubara et al. |
| 5,399,197 A | * | 3/1995 | Vermoortele et al. ....... 106/479 |
| 5,411,586 A | * | 5/1995 | Schmid et al. ............... 106/479 |
| 5,753,028 A | * | 5/1998 | Ochmann et al. ........... 106/479 |
| 5,851,587 A | | 12/1998 | Schittenhelm et al. |

FOREIGN PATENT DOCUMENTS

| | | |
|---|---|---|
| BE | 769799 | 1/1972 |
| DE | 422947 | 12/1925 |
| DE | 3135281 A1 | 3/1983 |
| DE | 3136279 A1 | 3/1983 |
| DE | 3409722 A1 | 9/1985 |
| DE | 3906670 A1 | 10/1989 |
| DE | 3926870 A1 | 2/1991 |
| DE | 4037878 A1 | 6/1991 |
| DE | 19733584 | 12/1998 |
| EP | 0239 526 | 9/1987 |
| EP | 0271813 B1 | 6/1988 |
| EP | 723998 B1 | 7/1996 |
| GB | 2034342 A | 6/1980 |
| GB | 2262518 A | 6/1993 |
| JP | 61123032 | 5/1986 |
| WO | WO 89/09805 | 10/1989 |
| WO | WO 92/11205 | 7/1992 |
| WO | WO 93/10045 | 5/1993 |

OTHER PUBLICATIONS

European Search Report from Application No. EP 99 87 0193 (1/00).

Gerhartz, W., et al., *Ullmann's Encyclopedia of Industrial Chemistry*, Fifth Completely Revised Edition (1985), p. 276–277, (No month).

Boron, Supplement of Mellor's Comprehensive Treatise on *Inorganic and Theoretical Chemistry*, vol. V. (1980), p. 572–579 (No month).

Lehmann, V. H.A., et al., Übert wasserhaltige Zinkborate. p. 37–43, with English Abstract, (Feb. 1967).

Bellingham, F., *Microbiological Protection from in the can to on the wall*. Polymer Paint Color (1992), p. 627–628, (No month).

* cited by examiner

*Primary Examiner*—Anthony J. Green
(74) *Attorney, Agent, or Firm*—Knobbe, Martens, Olson & Bear, LLP

(57) ABSTRACT

The present invention relates to a pigment based on bismuth vanadate with a bright vivid yellow to orange color exhibiting improved resistance, in particular an improved resistance to heat, characterized in that it is coated with several layers of inorganic compounds in several successive stages, the last layer being based on a zinc and boron compound. The present invention also relates to the process for producing this pigment and to its application.

8 Claims, No Drawings

HEAT RESISTANT BISMUTH VANADATE PIGMENT AND PROCESS FOR ITS MANUFACTURE

BACKGROUND OF THE INVENTION

1. Field

The present invention relates to a pigment based on bismuth vanadate, the behavior of which with respect to heat is greatly improved.

The invention also relates to the process for producing this pigment and to the application of the latter, in particular in the coloring of plastics, paints or lacquers.

2. Related Art

Bismuth vanadate is used, inter alia, as a yellow inorganic pigment. It is employed in coloring plastics and paints, also as a catalyst in the oxidation of olefins, as a contrast-enhancing pigment for television screens and as a reversible temperature indicator. It is a well known chemical compound (DE 422 947, U.S. Pat. Nos. 3,843,554, 4,115,142, JP 62277485 and DE 19733584).

Pure or modified pigments based on bismuth vanadate are nontoxic, have a vivid yellow color, have a high coloring strength and have excellent opaqueness, they are readily dispersed in their medium of use. However, their resistance, especially towards heat, is insufficient; this restricts their use in plastics or in formulations prepared or machined under hot conditions.

A large number of materials are colored with pigments: paints, lacquers, inks or plastics. In particular, compounds treated at high temperature, such as polyethylene, polystyrene, polycarbonate, polypropylene or Acrylnitril-Butadiene-Styrene (ABS-resin), are obtained by extrusion or injection molding of the colored mass softened with the heat. The use of a fairly high temperature results in an undesired change in the starting color (generally a darkening).

Numerous known processes attempt to improve the stability of pigments to light, to heat or to chemicals. These stabilization processes consist of a coating, a doping or a modification of the pigment crystal.

Patent Application EP 239 526 discloses a process for coating with a layer based on aluminum, on titanium, on cerium, on antimony, on zirconium, on silicon, on phosphorus or on zinc, in a proportion of 2 to 40%. According to Patent Application DE 4 037 878, the resistance of pigments to acids and especially to hydrochloric acid can be improved by coating with phosphates of metals, such as calcium, magnesium, aluminum, zinc, zirconium or titanium, in a proportion of 2 to 20%. Mentioned is made, in Patent Application WO 9211205, for pigments based on bismuth silicovanadate and/or phosphovanadate, of coatings of inorganic oxide, hydrate, silicate, phosphate and carbonate.

According to U.S. Pat. No. 4,063,956, the resistance to heat of thermoplastics and the resistance to chemicals is increased by coating with an inorganic precoat and subsequently with a thick layer of silicon oxide; thus, first a layer of hydrated oxides of aluminum, of silicon, of titanium, of boron, of tantalum, of molybdenum, of zinc, of manganese, of tin, of hafnium, of thorium, of niobium, of barium, of strontium, of nickel and/or of antimony is applied, with a preference for aluminum, silicon, titanium and boron. This precoat serves to increase the adhesion of the second layer, composed of amorphous and dense silicon oxide; the silica layer acts mainly to improve the resistance to heat and to acids.

A calcined pigment can also be coated in a bead mill; a first layer of silica is deposited in a basic medium and subsequently a second layer of silica is deposited, optionally in the presence of magnesium fluosilicate, of silanes or of an emulsion formed of polyethylene waxes (EP 271 813).

According to Patent Application DE 3,135,281, coating can also be carried out with layers of zirconium and silicon oxides in order to improve the resistance to light and resistance to beat in U.S. Pat. No. 4,115,142, the resistance of pigments is improved by coating with a layer of silica or of aluminum phosphate.

In Patent EP 723 998, the stability of bismuth vanadate pigments is improved by coating with compounds based on aluminum and zinc phosphates or on silicon and aluminum oxides.

In general, it may be said that any coating system recommended for improving pure or modified pigments based on bismuth vanadate resembles the well known and proven processes applied to various inorganic pigments: for example, titanium dioxides, chromium yellows, molybdenum oranges or iron oxides.

It is well known that powdered pigments, dried at more than 100° C., exhibit a less reactive surface due to the loss of hydroxyl groups. In point of fact, it is precisely these OH groups which Tnake possible good attachment of the coating layers. Consequently, it is difficult to obtain, by coating, sufficiently reliable stabilization of the pigments, in particular those based on bismuth vanadate, which allows them to be used in plastics or paints and resins treated at high temperatures.

It is the same with doping processes. Thus, according to U.S. Pat. No. 4,026,722, a pigment based on bismuth vanadate possessing improved resistance is obtained by virtue of crystallization with silicon and aluminum oxides. The amounts used are very large and even exceed the amount of bismuth vanadate.

According to Patent GB 2,034,342, mixtures of bismuth phosphate, of vanadium pentoxide and of zinc, calcium, barium and magnesium oxides can be calcined.

Patent U.S. Pat. No. 4,781,761 discloses stabilization of a pigment based on titanium, oxide by a first layer of amorphous and dense silica, doped with 10% of boron oxide, and by a second layer of aluminum oxide (2 to 8%).

According to Patent Application DE 3,926,870, the phototropism of pigments based on bismuth vanadate is reduced by providing them with a fine layer of trivalent iron oxide or hydrate (0.001 to 2%).

According to Patent Application DE 3,906,670, the resistance to heat of preparations comprising inorganic and organic pigments can be increased by doping with boron (3 to 10% of boric acid); the sole boron derivative with a truly effective action is boric acid; sodium tetraborate (borax) is not suitable, moreover.

In Patents DE 3,136,279 and DE 3,409,722, a mixture of zinc and iron oxides is treated, before calcination, with boron compounds ($H_3BO_3$, $BPO_4$) in a proportion of 0.1 to 1% or with compounds forming alumina phosphates ($Al2O_3$, $P_2O_5$, and the like), in order to obtain highly crystalline pigments with a very low content of chloride.

It was already known tat chemical compounds based on aluminum, antimony, ammonium and zinc hydroxides, oxides, phosphates or borates can render organic plastics more resistant to heat and can even slow down their combustion (U.S. Pat. No. 5,248,337, BE 769,799 and GB 2,262,518). The addition of these products to the pigment itself and not to the thermoplastic makes it possible to improve the resistance to heat to a slight extent (Patent EP 370 082).

The preparation of masterbatches with pigments treated with boric acid is generally difficult (undispersed residues, nonhomogeneity, and the like). However, the compound $H_3BO_3$ is necessary in order to obtain a degree of resistance to heat. These processes do not make it possible to obtain pigments based on bismuth vanadate which are simultaneously easy to use and highly resistant to heat (300° C.).

SUMMARY

The present invention is targeted essentially at obtaining bismuth-based pigments which correspond to high resistance requirements, in particular to excellent resistance to heat.

Another aim of the present invention is targeted at providing a bismuth-based pigment which can be easily used in materials subjected to high temperatures.

An additional aim of the present invention consists in providing a process which makes possible reliable and efficient attachment of the coating layers to a bismuth-based pigment crystal.

The invention relates to a pigment based on bismuth vanadate which exhibits an improved resistance to heat, characterized in that it is coated with several layers of inorganic compounds m several successive stages, the last of these layers being based on a zinc and boron compound.

Preferably, the pigment is precoated with at least one first layer of inorganic compounds selected from the group consisting of hydrates, oxides, silicates, carbonates, phosphates or borates of elements selected from the group consisting of titanium, aluminum, zinc, antimony, silicon, boron, calcium, zirconium, niobium and rare earth metals, in particular cerium, lanthanum, neodymium, praseodymium, samarium or yttrium, or a mixture of these.

The pigment preferably comprises a first layer of one or more deposits of oxides, hydrates, carbonates and/or phosphates of elements selected from the group consisting of titanium, zirconium, aluminum, calcium and rare earth metals.

Secondly, one or more layers of a mixture of silicon oxide and/or hydrate is/are deposited on the pigment provided with a first layer, according to well known processes, for example precipitation under hot conditions of an alkali metal silicate solution by decreasing the pH by programmed addition of a dilute inorganic acid Finally, a third layer, which can be based on inorganic compounds formed of zinc, magnesium, aluminum and/or boron borates, oxides or hydrates, is deposited on the pigment provided with these first two layers; preferably, an inorganic compound based on zinc and on boron is deposited.

Generally, the coating of the pigment with these successive deposits of inorganic compounds represents from 0.1% to 40% of the pigment.

Additional treatments can optionally also be applied to the pigment thus stabilized. It is possible to render the pigment less dusty by treating it with dry or pasty anticaking agents: for example polyalcohols, polyfluoroethylene, aromatic acid esters, silicone and other surfactants and emulsifiers; they can also be passed into presses and granulators. It is also possible to use agents which improve the appearance and the processing, such as alcohols or polyalcohols with long aliphatic chains, fatty amines, resins and various types of anionic, cationic or nonionic surface-active agents.

A pigment based on bismuth vanadate, precoated with a first layer based on aluminum, on phosphorus, on titanium, on calcium or on rare earth metals in a proportion of 1 to 5% and then coated with a second layer based on silicon in a proportion of 5 to 25%, exhibits a degree of resistance to heat which can be further improved to a slight extent by addition of boric acid in a proportion of 1 to 10%. A pigment is then obtained with, for example, a resistance to heat in polyethylene of about 250° C. ($\Delta E°$=less than or equal to 3.0).

Surpsingly and unexpectedly, the resistance to heat of a pigment based on bismuth vanadate is significantly improved further, provided that an additional layer based on 1 to 10% of boron and zinc compounds, which theoretically form a zinc borate hydrate, is precipitated on the layer based on silicon oxide.

According to the scientific literature, zinc borate hydrates are obtained by reaction in an aqueous medium of soluble zinc salts and of alkali metal borates or boric acid according to a chemical reaction of the type:

$$2ZnO+2H_4SO_4 \rightarrow 2ZnSO_4+2H_2O$$

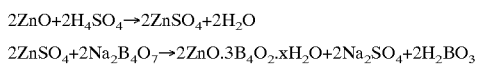

(The water of crystallization of the reactants is not taken into account). If the reaction temperature is increased, the content of water of hydration (x) decreases: see, for example, U.S. Pat. Nos. 2,405,366, 3,126,352 and 3,649,172 and WO 9310045. Teachings on the subject of the preparation, properties and use of zinc borates are mentioned in particular in:

Mellor's Comprehensive Treatise on Theoretical Chemistry—Supplement, Vol. V, Par A, 572 . . . (1980)

Uhlmann's Encyclopedia of Industrial Chemistry, Vol A4, 276 . . . (1985)

H. A. Lehman et al., Ueber wasserhaltige Zinkborate [On zinc borate hydrates], Z. for anorg. und allg. Chem., Vol. 354, No. 1, 37–43 (1967)

F. Bellingham, Zinc borate in intumescent paints, Polym. Paint Col. J., Vol. 182, No. 4319-627–8 (1992).

A resistance to heat in polyethylene of approximately 300° C. ($\Delta E°$=less than or equal to 3.0) is then obtained, for example. Such a resistance is never obtained with other compounds based on borates of other metals (Na, Al, Mg, Ba, and the like). The addition of zinc borate to the masterbatch, instead of the precipitation on the pigment, does not give a resistance of greater than 250–260° C.

This special coating with a final layer of a compound based on zinc borate provides a bismuth vanadate pigment which is furthermore very easily incorporated in colored plastic masterbatches. The ease of preparation of a masterbatch is thus combined with a very high resistance to heat; this is never obtained with other processes, such as the application of layers of boron oxide, of antimony oxide, of aluminum oxide or of magnesium or boron compounds.

Another obvious advantage of the ease of dispersion of the pigment obtained is the absence of grains in the pigmented formulations.

The invention also relates to the process for producing a pigment based on bismuth vanadate, according to which the coating is formed at the surface of the pigment crystal, very finely reslurried in an aqueous medium under hot conditions, and comprises at least one inorganic compound. A final aspect of the invention relates to the application of the pigment according to the invention in coloring plastics, industrial coatings, resins and lacquers produced or machined at high temperature.

DETAILED DESCRIPTION

The invention relates to a pigment based on bismuth vanadate which is very substantially improved by the coating of highly specific inorganic compounds. Unexpectedly, the pigments thus treated exhibit excellent resistance. This degree of resistance is never obtained with the processes of the prior art.

The pigment is treated in the following way, in three stages:

$1^{st}$ stage: the pigment is coated with a stabilizing coating based on oxides or hydrates of titanium, of mare earth metals, of aluminum, of phosphorus or of calcium, according to a proven and known technique.

$2^{nd}$ stage: the pigment is resuspended in an aqueous medium with a source of silica, which is deposited at high temperature (60–100° C.) by addition of acid, according to a proven and known technique.

$3^{rd}$ stage: finally, a compound based on zinc borate is precipitated from zinc and boron salts.

This third stage is determining for the production of a bismuth vanadate pigment possessing high resistance to heat. If it is omitted, if it is used without the other two stages or if other chemical compounds are used, the expected effect is not obtained. Furthermore, it is necessary to follow the order indicated for the three stages and none thereof may be omitted: in that case, an effect is obtained which is greater than that which might be expected from each of the stages taken separately.

Thus, aluminum oxides or hydrates might be used (U.S. Pat. No. 4,063,956) or silica might be precipitated with boron oxide or hydrate (U.S. Pat. No. 4,784,761) but the results obtained are markedly worse. A physical mixture of a zinc borate and of a bismuth vanadate pigment treated in a known way with silica (U.S. Pat. No. 3,649,172) might also be prepared in proportions 10:90 to 1:99. The degree of resistance to heat obtained according to the process of the invention is never achieved in this case.

Use may be made, as boron source, of alkali metal metaborates and tetraborates, mainly sodium and potassium tetraborates $Na_2B_4O_7.10H_2O$, $K_2B_4O_7.4H_2O$ or $Na_2B_4O_7.5H_2O$, and boric acid $H_3BO_3$.

Use may be made, as zinc source, of soluble zinc salts, for example acetate $(CH_3COO)_2ZN.2H_2O$, chloride $ZnCl_2$, nitrate $Zn(NO_3)_2.6H_2O$, sulfate $ZnSO_4.7H_2O$ as well as oxide ZnO, provided that it is dissolved before hand in the appropriate amount of acid (acetic, nitric, hydrochloric or sulfuric).

The following examples serve to illustrate the invention

EXAMPLES

Example 1

A bismuth vanadate pigment comprising 1 to 10% of coating layers based on oxides, hydrates, phosphates or carbonates of aluminum, of titanium, of calcium or of rare earth metals is taken as the starting material.

100 g of bismuth vanadate pigment are added with stirring to a dispenser comprising 0.75 1 of water. Stirring is carried out very vigorously for 2 to 10 3 hours in order to obtain a good dispersion.

This Suspension is run into a 5 liter reactor and the volume is adjusted to 3 liters by addition of water. The temperature is raised to 90° C. and the pH is adjusted to 90.0 with constant stirring. The temperature of 90° C. is maintained throughout the manufacturing. 0.2 1 of a basic aqueous sodium silicate solution (comprising 32 g of $Si_2$) is subsequently added over 45 minutes. After having stirred for 30 minutes, the pH being equal to 10.0, approximately 0.4 1 of a 3.7% dilute aqueous sulfuric acid solution is allowed to run in dropwise over a period of 4 h. Care is taken that the pH of the suspension is not less than 7.0–7.2. Finally, the suspension is stirred for a further 30 minutes. A reference pigment coated with a precoat (2.5 to 3%) and with a silica layer (25 to 30%) is thus obtained. The pigment is obtained in the powder form after faltering, washing, drying and milling.

Example 2

A bismuth vanadate pigment is prepared according to the procedure of Example 1 but, after the final stirring for 30 minutes, the manufacture is c )tin ed by adding, over 15 minutes, a solution of 10 g of zinc nitrate in 0.1 1 of water. Subsequently, 9.6 g of sodium tetraborate (borax) are also added and stirring is carried out for 30 minutes. The pH is then approximately 7.0. After filtering, washing, drying and milling, a bismuth vanadate pigment is obtained. The silica layer of which is coated with zinc and boron.

Example 3

A bismuth vanadate pigment is prepared according to the procedure of Example 2 but the 9.6 g of borax are replaced therein with 6.25 g of boric acid. After the stirring for 30 minutes a pH in the region of 5.5 is obtained. Neutralization is carried out over 30 minutes with a 10% aqueous sodium hydroxide solution in order to obtain a final pH of 7.0–7.2.

After filtering, washing, drying and milling, a bismuth vanadate pigment is obtained, the silica layer of which is coated with zinc and boron.

Example 4

The procedure of Example 3 is used but the 10 g of zinc nitrate are replaced therein with 4.6 g of zinc chloride.

A bismuth vanadate pigment is again obtained, the silica layer of which is coated with zinc and boron.

Example 5

A bismuth vanadate pigment is prepared according to the procedure of Example 2 but the 10 g of zinc nitrate are replaced therein with 8.6 g of magnesium nitrate.

a bismuth vanadate pigment is obtained, the silica layer of which is coated with magnesium and boron

Example 6

A physical mixture of 100 g of the pigment obtained according to the procedure of Example 1 with 5 g of one or other of the flowing boron-based compounds: zinc borate, barium borate or boric acid, is prepared in a powder blender.

In this way, a bismuth vanadate pigment is obtained which is covered with a layer of silica and which is intimately dry-blended with:

a) 5% of zinc borate $2ZnO.3B_2O_3.3.5H_2O$
b) 5% of barium borate $BaB_2O_4.H_2O$
c) 5% of boric acid $H_3BO_3$.

Example 7

(Testing Method in Plastics)

The resistance to heat of the pigments prepared according to the present invention is measured in the following way. A preblend is prepared by blending 60% of pigment based on bismuth vanadate with 30% of linear low density polyethylene (eg. LL6201RQ from Exxon) and 10% of polyethylene wax (e.g. AC8A). This preblend is poured into a twin-screw extruder (e.g. Collin) rotating at 300 rev/min and heated to 150° C. The combined contents are extruded, cooled and granulated. A masterbatch is thus obtained and is diluted in high-density polyethylene (e.g. Eltex A4090) in order to obtain granules of dilute masterbatch with a degree of pigmentation of 0.5%. Subsequently, the granules are passed into an injection molding press at temperatures varying from 200° C. to 300° C. or more, with retention times of 30 set at 200° C. and 5 minutes at 200, 210, 220, ... 300° C. or more. The injection is carried out in a mold which provides colored plastic test specimens, the darkening of which is determined by spectrophotocolorimetric measurement, the test specimen of 30 sec at 200° C. being taken as comparison standard. The resistance temperature is obtained when the threshold of $\Delta E° - 3.0$ units is exceeded (DIN 53772).

The results of tests of resistance to heat are shown in the appended Table I.

The values in this table illustrate the excellent resistances to heat of Examples 2, 3 and 4, carried out according to the preferred embodiment of the invention. Examples 5 and 6b show that zinc cannot be replaced by other metals, such as magnesium or barium, for example. Example 6C shows that boron without zinc is not as effective. In the same way, Example 6a shows that the purely physical addition of zinc borate is not as good as the process of the invention, where the zinc and boron salts are precipitated in the final stage.

Unless specified otherwise the percentages in the specification and claims are weight percentages.

TABLE 1

| $\Delta E^n$ | 200° C. | 230° C. | 240° C. | 250° C. | 260° C. | 270° C. | 280° C. | 290° C. | 300° C. | Resistance temperature |
|---|---|---|---|---|---|---|---|---|---|---|
| Example 2 | 0.92 | 0.73 | | | 0.65 | 0.78 | 1.40 | 1.90 | <u>2.90</u> | 300° C. |
| Example 3 | 0.60 | 0.92 | | | 1.70 | 1.21 | 1.39 | 2.26 | <u>2.80</u> | 300° C. |
| Example 4 | 0.62 | 0.40 | | | 1.17 | 1.29 | 1.50 | 1.71 | <u>3.01</u> | 300° C. |
| Example 5 | 0.51 | 1.36 | | <u>2.87</u> | 5.64 | | | | | 250° C. |
| Example 6a | 0.93 | 0.63 | | 1.71 | <u>2.69</u> | 3.30 | | | | 260° C. |
| Example 6b | 0.36 | 0.63 | 2.40 | <u>2.65</u> | 3.37 | | | | | 250° C. |
| Example 6c | 0.38 | 1.07 | | 1.92 | <u>2.85</u> | 4.33 | | | | 260° C. |

What is claimed is:

1. A pigment comprising bismuth vanadate coated with a plurality of layers of inorganic compounds, wherein said plurality of layers comprises a last layer, and wherein at least the last layer comprises boron and zinc.

2. The pigment of claim 1, wherein said plurality of layers comprises a first layer and wherein at least the first layer comprises a compound selected from the group consisting of titanium, calcium, rare earth metals, aluminum, phosphorous, silicon, boron, zinc and combinations thereof.

3. The pigment of claim 1, wherein said plurality of layers comprises a second layer and wherein at least the second layer of said plurality of layers comprises silicon.

4. The pigment according to claim 1, wherein said layers comprise approximately 0.1% to 40% of said pigment.

5. The pigment according to claim 4, wherein said layers comprise approximately 1% to 35% of said pigment.

6. A method of manufacturing a pigment comprising coating bismuth vanadate with one or more layers of inorganic material, wherein at least an outermost layer of inorganic material comprises zinc and boron.

7. A pigmented article of manufacture comprising:
   a substrate material; and
   a pigment comprising bismuth vanadate coated with a plurality of layers of inorganic compounds, wherein said plurality of layers comprises a last layer, and wherein at least the last layer comprises boron and zinc.

8. The article of manufacture of claim 7, wherein said substrate material comprises an organic polymer or solvent.

* * * * *